United States Patent
Sugata et al.

(10) Patent No.: US 6,811,361 B2
(45) Date of Patent: Nov. 2, 2004

(54) COLUMN FIXED TYPE MACHINE TOOL

(75) Inventors: Shinsuke Sugata, Fukuyama (JP); Yoshihide Seo, Hiroshima-ken (JP)

(73) Assignee: Horkos Corp., Fukuyama (JP)

( * ) Notice: Subject to any disclaimer, the term of this patent is extended or adjusted under 35 U.S.C. 154(b) by 43 days.

(21) Appl. No.: 10/258,489

(22) PCT Filed: May 9, 2001

(86) PCT No.: PCT/JP01/03879

§ 371 (c)(1), (2), (4) Date: Oct. 25, 2002

(87) PCT Pub. No.: WO01/85390

PCT Pub. Date: Nov. 15, 2001

(65) Prior Publication Data

US 2003/0143048 A1 Jul. 31, 2003

(30) Foreign Application Priority Data

May 10, 2000 (JP) .................................... 2000-137423

(51) Int. Cl.⁷ ............................. B23C 1/02; B23Q 11/08
(52) U.S. Cl. ...................................... 409/134; 409/137
(58) Field of Search ................................ 409/134, 235, 409/191, 135, 136, 137; 29/DIG. 53, DIG. 56, DIG. 59, DIG. 60, DIG. 94, DIG. 102; 74/608, 612, 613; 408/241 G, 243; 451/451; 483/3; 144/252.1, 251.1; 83/860

(56) References Cited

U.S. PATENT DOCUMENTS

| 3,824,890 A | * | 7/1974 | Zettler et al. ............... 409/134 |
| 5,265,497 A | * | 11/1993 | Curless ....................... 409/134 |
| 5,482,414 A | * | 1/1996 | Hayashi et al. ............. 409/134 |
| 5,662,568 A | * | 9/1997 | Lindem ....................... 409/235 |
| 5,871,312 A | * | 2/1999 | Haninger et al. ............ 409/134 |
| 6,012,884 A | * | 1/2000 | Azema ........................ 409/191 |
| 6,082,939 A | * | 7/2000 | Nakashima et al. ........ 409/134 |
| 6,120,222 A | * | 9/2000 | Hiramoto et al. ........... 409/134 |
| 6,120,223 A | * | 9/2000 | Hirose et al. ............... 409/134 |
| 6,519,823 B1 | * | 2/2003 | Sugata et al. ............... 409/235 |
| 6,551,038 B1 | * | 4/2003 | Sugata et al. ............... 409/134 |

FOREIGN PATENT DOCUMENTS

| EP | 614724 A2 | 9/1994 | |
| EP | 913228 A1 | 5/1999 | |
| JP | 62-92144 U | 6/1987 | |
| JP | 4-115554 U | 10/1992 | |
| JP | 04365529 A | * 12/1992 | ............ B23Q/1/00 |
| JP | 08025161 A | * 1/1996 | ............ B23Q/1/01 |
| JP | 08025170 A | * 1/1996 | ........... B23Q/11/08 |
| JP | 8-155781 A | 6/1996 | |
| JP | 10-138085 A | 5/1998 | |
| JP | 10138085 A | * 5/1998 | ........... B23Q/11/08 |
| JP | 11-207565 A | 8/1999 | |
| JP | 2000-24870 A | 1/2000 | |
| JP | 2000-33530 A | 2/2000 | |
| JP | 2000176783 A | * 6/2000 | ........... B23Q/11/08 |
| WO | Wo 9722832 A1 | * 6/1997 | ........... B23Q/11/08 |
| WO | WO 200103883 A1 | * 1/2001 | ........... B23Q/11/08 |

* cited by examiner

*Primary Examiner*—Daniel W. Howell
*Assistant Examiner*—Dana Ross
(74) *Attorney, Agent, or Firm*—McGinn & Gibb, PLLC

(57) ABSTRACT

A column fixed type machine tool capable of surely suppressing the dispersion of chips and coolant to the outside of a machining space and reducing the entire size thereof so as to increase a workability and improve a working environment, wherein a column (2) is installed fixedly on a bed (1), a spindle head (8) is installed at the front of the column movably in vertical, lateral and longitudinal directions (f1, f2, f3), a jig device (42) is installed on the bed at the front of the column, a column side cover body (cov1) densely covering the front surface of the column is provided so as to protect against the dispersion of chips, the cover body is formed so as to allow the spindle head (8) to be moved in vertical and lateral directions, a jig side cover body (cov2) covering at least the surrounding of a jig main body part (47) is installed, an intermediate cover body (cov3) covering the upper and right and left sides of the spindle head moving range is installed between the jig side cover body and the column side cover body, and the sizes of the cover bodies are optimized.

5 Claims, 17 Drawing Sheets

A

B

COLUMN FIXED TYPE MACHINE TOOL

FIELD OF THE INVENTION

The present invention relates to a column fixed type machine tool in which column is fixed on a bed.

BACKGROUND OF THE INVENTION

A column fixed type machine tool is disclosed in Japanese Provisional Publication No. 365529 of 1992. As shown therein, the column fixed type machine tool is defined by a column installed fixedly on a bed, a spindle head installed at the front of the column for movement in vertical and lateral directions, and a jig installed on the bed at the front of the column.

Generally, this kind of machine tool is provided with a single square cover wall for covering the whole bed positioned at the front of the column to prevent the dispersion of chips and coolant.

In the conventional column fixed type machine tool, the contained volume of the cover wall is so large that the chips and the coolant disperse in a wide area. Therefore, it is difficult to recover them smoothly and rapidly. Besides, the large cover wall prevents various operations, and the high cover wall obstructs the view.

An object of the invention is to provide a column fixed type machine tool that can solve the above-mentioned problems.

SUMMARY OF THE INVENTION

The present invention proposes a column fixed type machine tool in which a column is fixed on a bed, a spindle head is installed at the front of the column for movement in vertical, lateral and longitudinal directions through a first saddle and a second saddle, a jig device is fixed at a limited position of the bed at the front of the column, wherein a first cover plate allowing the spindle head to move in a longitudinal direction is fixed on the front surface of the second saddle, a second cover plate covering the front side, the upper side and the below side of the first cover plate so as to allow the spindle head to move in a lateral direction is fixed on the first saddle in a body, and a column side cover body covering the front surface of the column so as to allow the spindle head to move in vertical and lateral directions is provided at the front side of the second cover plate.

On the other hand, a jig side cover body covering the surrounding of a jig main body part is installed on a jig device. Besides, an intermediate cover body covering the upper and right and left side surfaces of the spindle head moving range is installed between the jig side cover body and the column side cover body. Moreover, the column side cover body, the jig side cover body and the intermediate cover body are formed independently from each other, and are detachable separately.

In this case, the spindle head may as well be installed on the front surface of the column movably in longitudinal direction. The column side cover body can allow the spindle head protruded forward therefrom to be moved in longitudinal direction. Here, instead of moving the spindle head in longitudinal direction, the jig device may be moved in longitudinal direction.

A cutting tool is installed at the tip of the spindle head. Moving in vertical and lateral directions with a spindle, or moving in a longitudinal direction relative to a workpiece, the cutting tool cuts the workpiece, which is clamped by the jig device. Though chips generated by the cutting disperse within the jig side cover body, they are prevented from dispersing to the outside of a specific space surrounded by the jig side cover body, the intermediate cover body and the column side cover body. The chips fall down on the upper surface of the bed.

The sizes of the jig side cover body, the intermediate cover body and the column side cover body are optimized, respectively. Specifically, the jig side cover body covers the jig device clamping the work so as not to make a useless space. The intermediate cover body covers the spindle head moving range in vertical and lateral directions and in a longitudinal direction relative to the workpiece clamped by the jig main body part so as not to make the useless space. The column side cover body is formed so that the chips dispersed from the cutting tool are prevented from dispersing to the backside of the front surface of the column.

The heights of the column side cover body, the intermediate cover body and the jig side cover body are different from each other. In this case, the column side cover plate is the highest, and the intermediate cover body is the lowest of all. Hence, an exhaust duct is installed on the upper surface of the lowest intermediate cover body. That is to say, as shown in claim 2, the column side cover body, the intermediate cover body and the jig side cover body are formed independently and detached separately.

Accordingly, each cover body is manufactured independently and assembled to the bed. Besides, each cover body is assembled and disassembled easily. Therefore, the maintenance or the inspection within a space surrounded by the cover bodies is performed conveniently.

Besides, a dropping hole for exhausting chips is provided in the bed part positioned below the intermediate cover body. Hence, the chips dispersed from the cutting tool are intercepted by the jig side cover body, the intermediate cover body and the column side cover body, thereafter reaching a specific place through the dropping hole by gravitation.

Moreover, a chip exhausting device is provided below the dropping hole. In this case, the chips dropped therefrom land on a carrier surface of the chip exhausting device and are taken out to a specific place without a person's help.

BRIEF DESCRIPTION OF THE DRAWINGS

FIG. 5A is a perspective view of the first saddle and FIG. 5B is a perspective view of the second saddle.

FIG. 7A is a plan view, FIG. 7B is a side view and FIG. 7C is a sectional view taken on the line X-X of FIG. 7A.

FIG. 12A is a view of the first cover plate positioned at right end of its moving range, and FIG. 12B is a view of the first cover plate positioned at left end thereof.

PREFERRED EMBODIMENT OF THE PRESENT INVENTION

Figure 1:
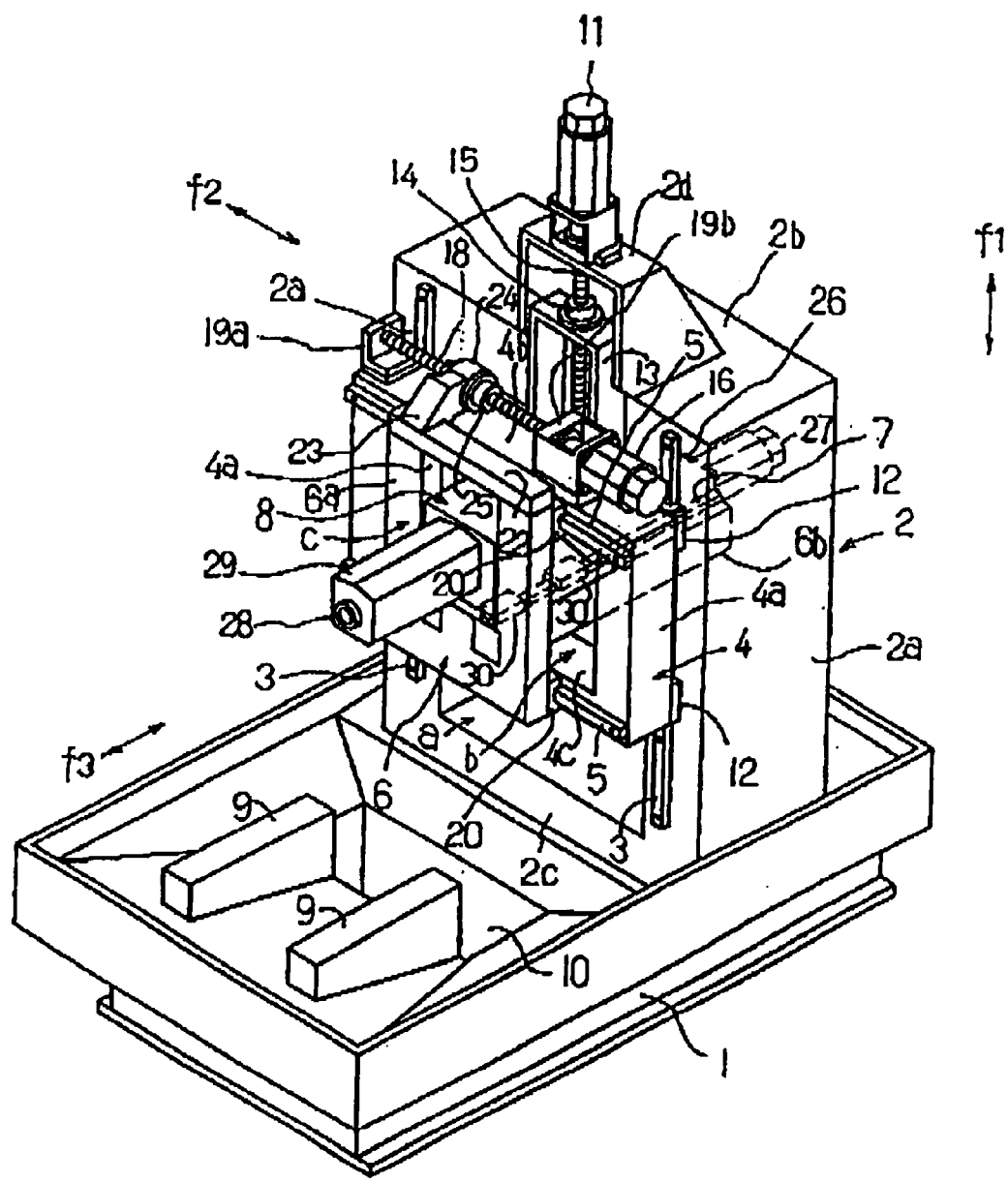
FIG. 1 is a perspective view of a part of a machine tool (machining center) relating to the present invention.
Figure 2:
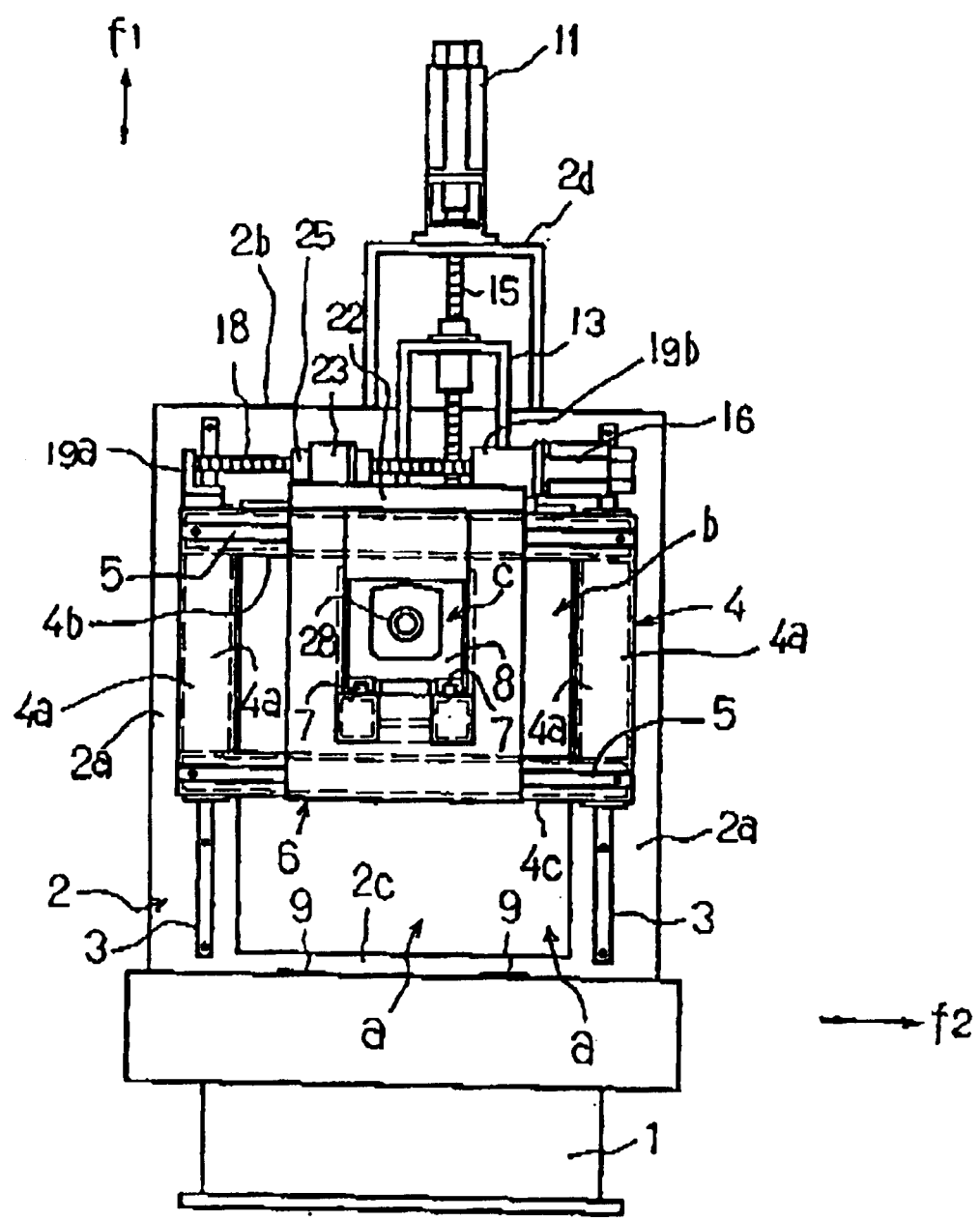
FIG. 2 is a front view thereof.
Figure 3:
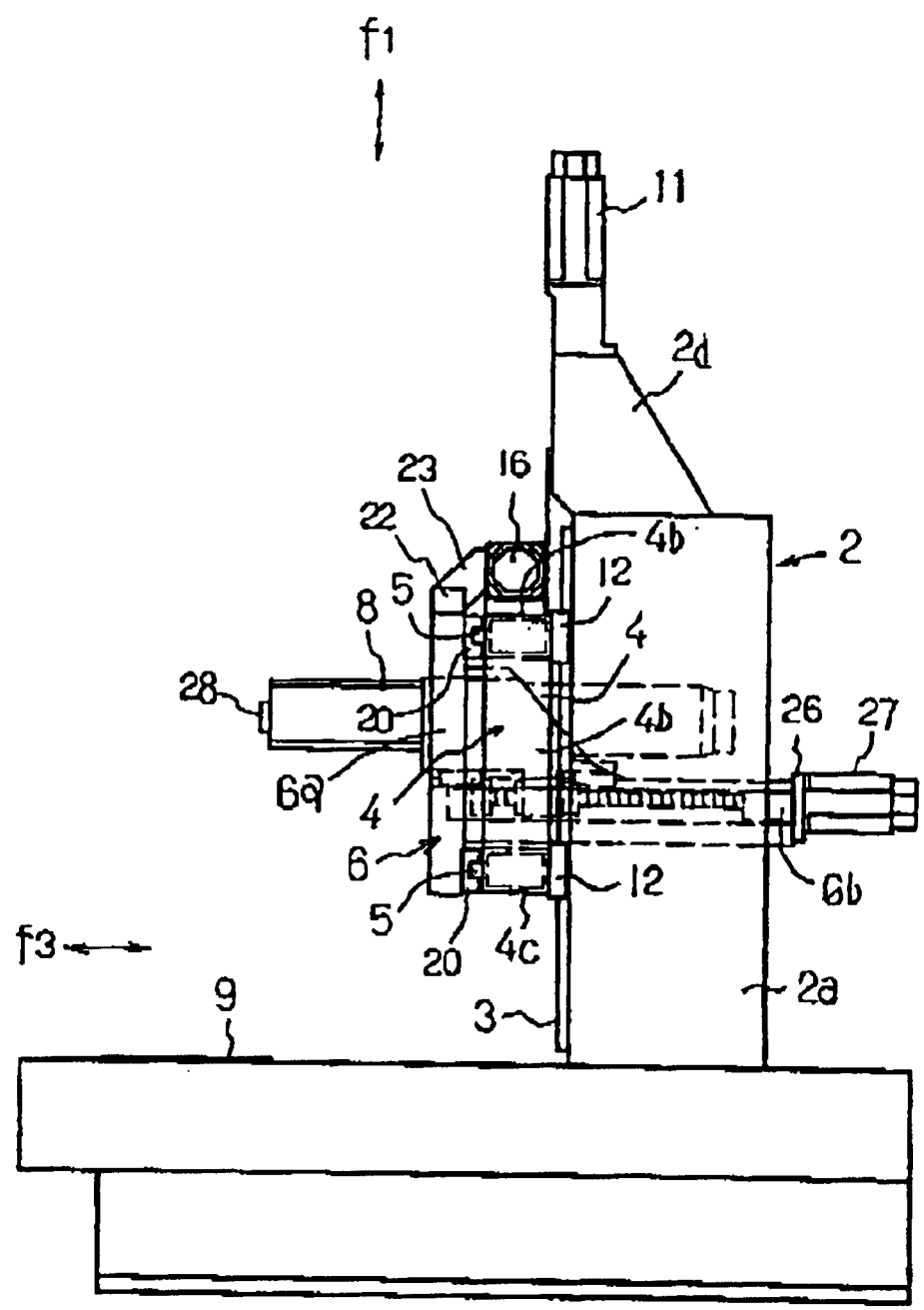
FIG. 3 is a side view thereof.
Figure 4:
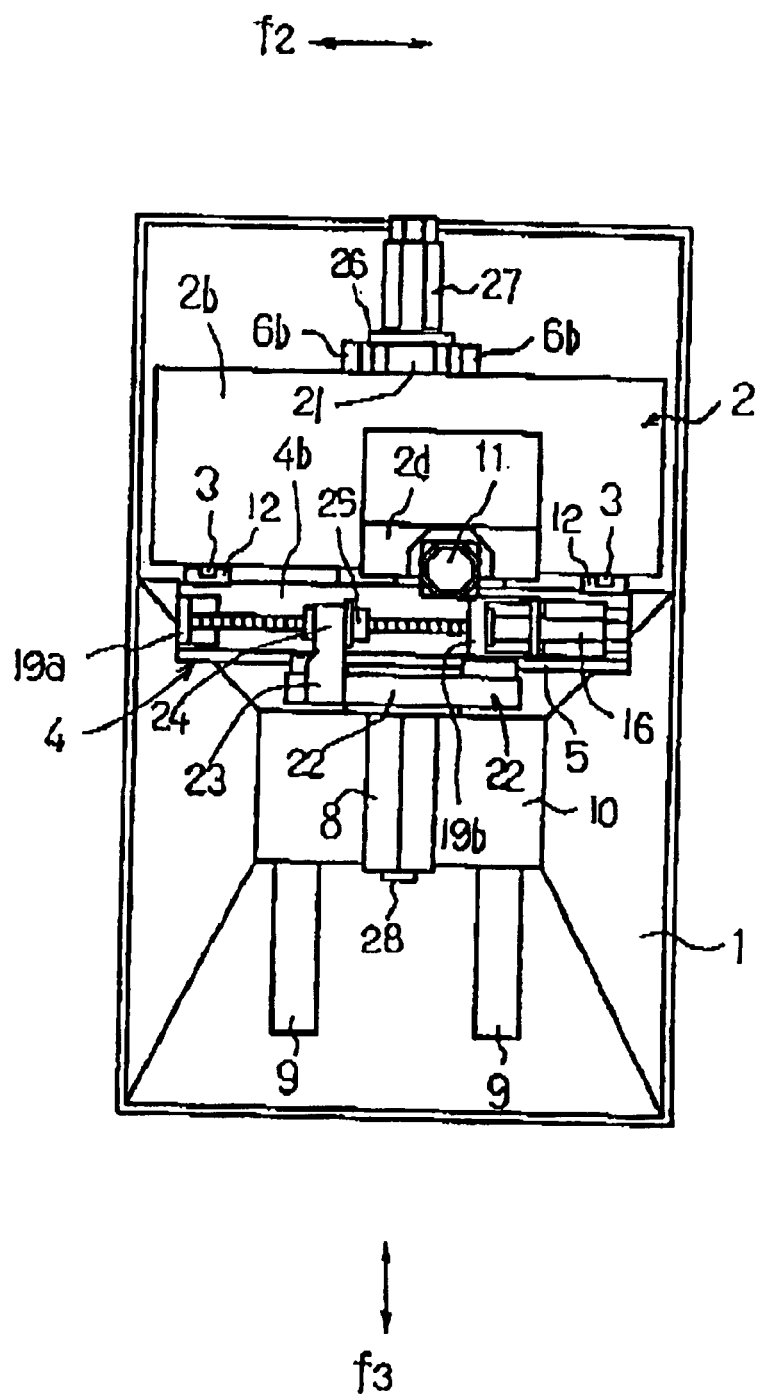
FIG. 4 is a plan view thereof.

FIGS. 1 to 4 show a machine tool comprising a bed 1, a column 2, a first saddle 4, a second saddle 6 and a spindle head 8. The bed 1 forms the lowest part. The column 2 is installed fixedly on the upper surface of the bed 1. The first saddle 4 is guided slidably in vertical direction f1 by a pair of vertical guide rails 3, 3 installed fixedly on the front surface of the column 2. The second saddle 6 is guided slidably in lateral direction f2 by a pair of lateral rail members 5, 5 installed fixedly on the front surface of the saddle 4. The spindle head 8 is guided slidably in the longitudinal direction f3 by a pair of longitudinal rail members 7, 7 installed fixedly on the second saddle 6.

The structure of each of these components is explained as follows.

The bed 1 is formed in a box shape with a steel plate. Supporting members 9, 9 are fixed on the upper surface of the bed 1 at the front of the column 2. A dropping hole 10 is formed at the center of the bed 1 to drop chips and coolant to a specific place.

The column 2 comprises a pair of right and left vertical parts 2a, 2a and a pair of top and bottom lateral parts 2b, 2b. Hence, the column 2 is mainly composed of a square frame body having a comparatively large longitudinal square hole "a" at the center. A motor table 2d is provided on the top lateral part 2b. A servomotor 11 is fixed on the motor table 2d to drive the first saddle 4 vertically.

Figure 5:
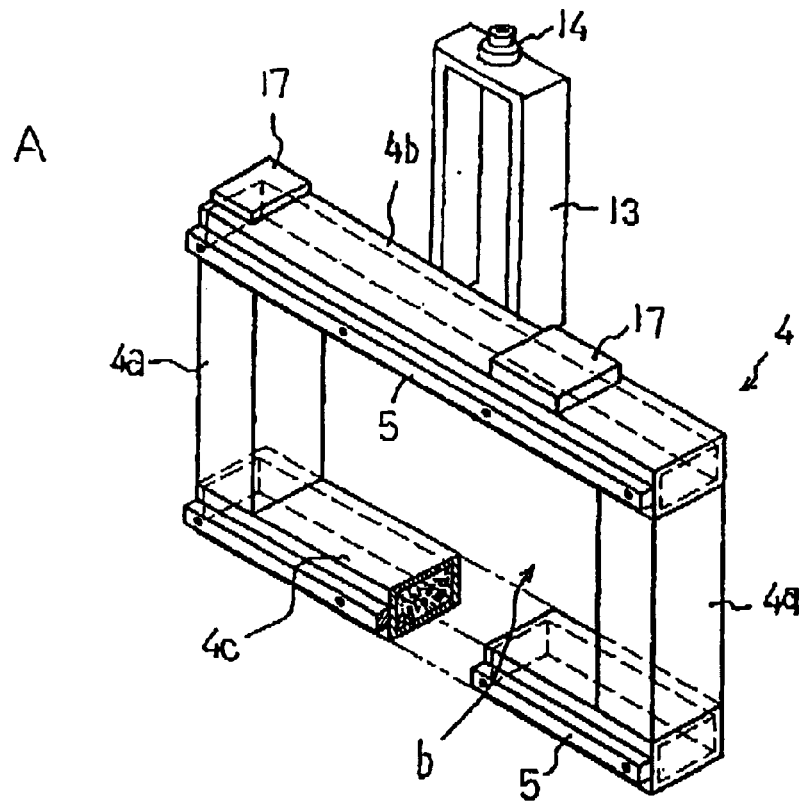
FIG. 5 shows a part of the machine tool.
Figure 5:
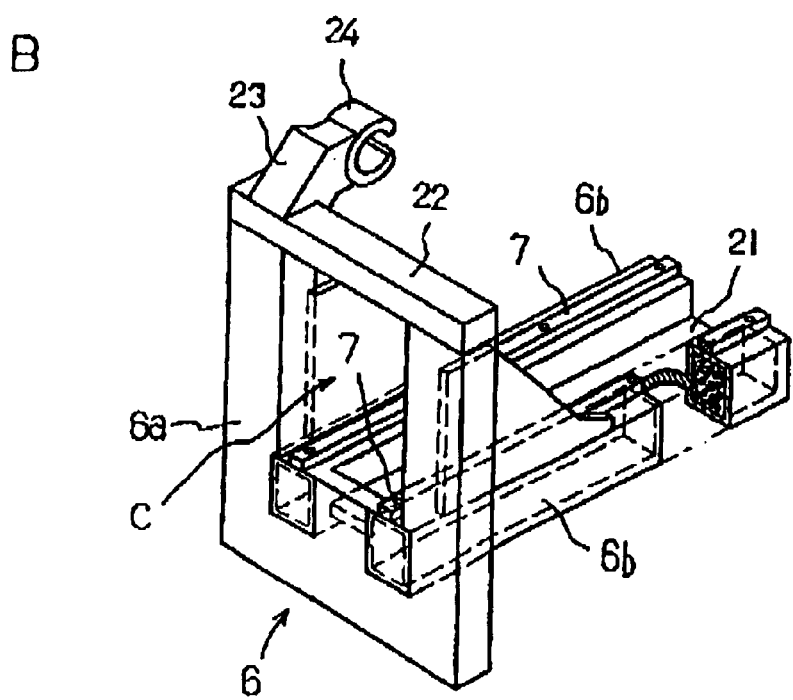

As shown in FIG. 5A, the first saddle 4 comprises a pair of right and left vertical single prismatic bodies 4a, 4a having a square section and a pair of top and bottom lateral single prismatic bodies 4b, 4c. Hence, the first saddle 4 has a comparatively large longitudinal rectangular hole "b" at the center, and is formed into a large vertical rectangular frame body made from a steel plate in a size that it gets into the front surface of the column 2. Interfitted members 12 are fixed on the back surface of the rectangular frame body so as to be guided by the rail members 3, 3. A pair of rail members 5, 5 are fixed on the front surface of the top and bottom lateral prismatic bodies 4b, 4c to guide the second saddle 6. A bracket 13 having an inverse U section when viewed from the front is fixed on the back surface of the top lateral prismatic body 4b, and a nut body 14 is fixed on the top of the bracket 13. In this case, the single prismatic bodies 4a, 4b, 4c may be formed integrally by plural prismatic members having a square section.

A vertical thread axis 15 is screwed into the nut body 14 so as to combine to an output axis of the servomotor 11. A servomotor 16 is installed on the upper surface of the top lateral prismatic body 4b to drive the second saddle 6 laterally. Besides, as shown in FIG. 5A, a pair of reinforcing plates 17, 17 are installed fixedly on the upper surface of the lateral prismatic body 4b. On the reinforcing plates 17, 17, bearing members 19a, 19b are fixed to support rotatively a lateral thread axis 18 combined to an output axis of the servomotor 16.

As shown in FIG. 5B, the second saddle 6 has a longitudinal rectangular hole "c" at the center, which is formed in a size that enables the spindle head 8 to be inserted. The second saddle 6 is formed into a large vertical rectangular frame body 6a in a size that it gets into the front surface of the first saddle 4. A pair of right and left horizontal induction frames 6b, 6b comprised of square cylinder members made from a steel plate are fixed longitudinally to the back surface of the rectangular frame body 6a, and plural interfitted members 20 guided by the rail members 5, 5 are fixed thereon. Besides, a longitudinal rail member 7 is installed fixedly on the upper surface of each horizontal induction frame 6b. A horizontal steel plate 21 connects side surfaces of the horizontal induction frames 6b, 6b.

A bulging member 23 is installed on one side of the upper surface of a top lateral prismatic body 22 of the square frame body 6a toward a slanting back upper part, and an open ring-shape nut holding member 24 is fixed on the tip of the bulging member 23. The lateral thread axis 18 is screwed into a nut body 25 held by the nut holding member 24. Besides, a vertical support plate 26 is fixed between back ends of the horizontal induction frames 6b, 6b, and a servomotor 27 is fixed on the back surface of the support plate 26 to move the spindle head 8 in longitudinal direction f3.

The spindle head 8 has a head frame 29 to support a longitudinal spindle 28 rotatively. In the head frame 29, a not-illustrated drive motor is installed to rotate the spindle 28, and, on the bottom surface of the head frame 29, plural interfitted members 30 guided by the rail members are provided.

A not-illustrated screw-nut structure is formed between the head frame 29 and the servomotor 27, so that the head frame 29 is moved by rotations of the servomotor 27 longitudinally.

Figure 9:
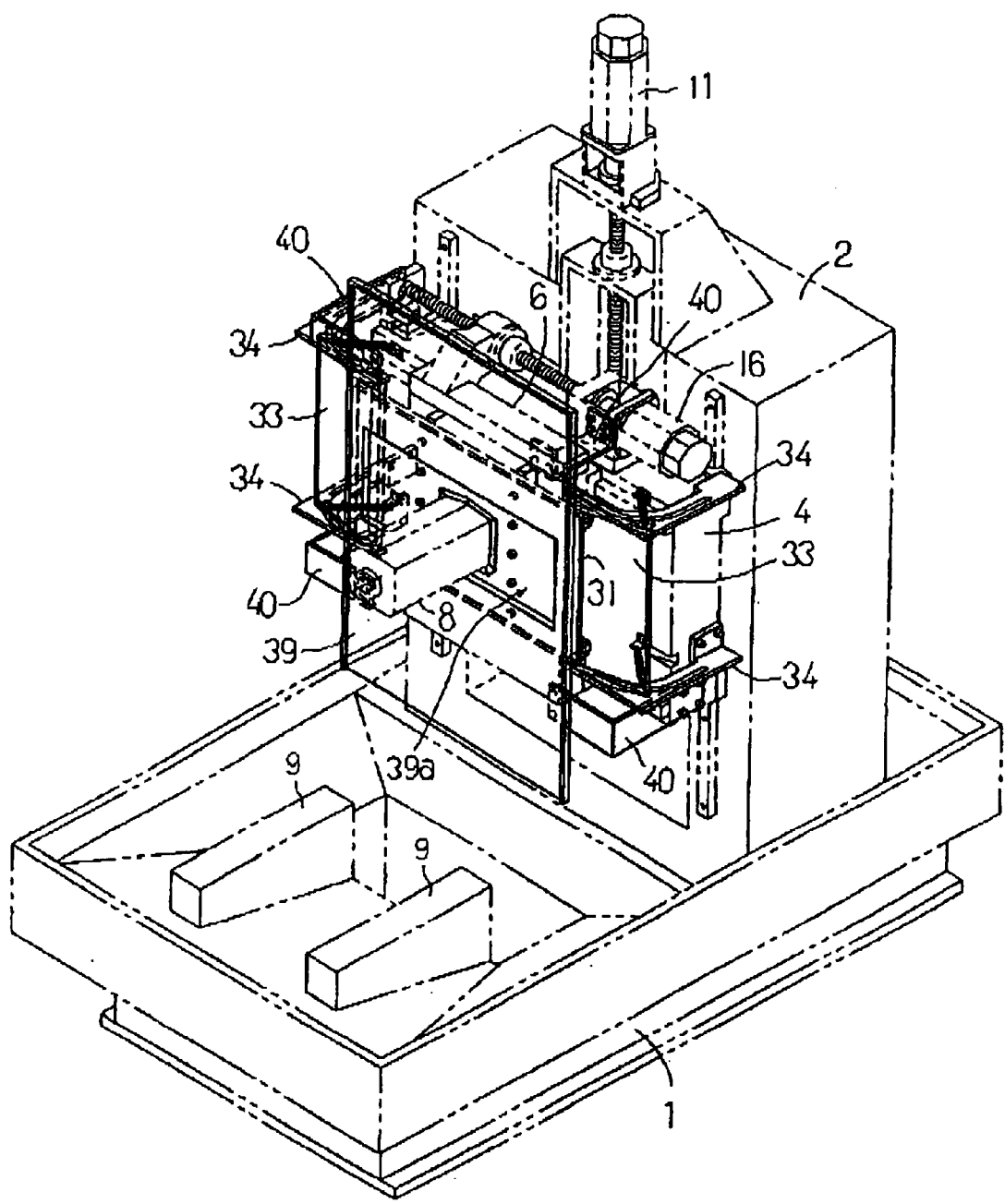
FIG. 9 is a perspective view of the machine tool provided with the second cover plate.
Figure 10:
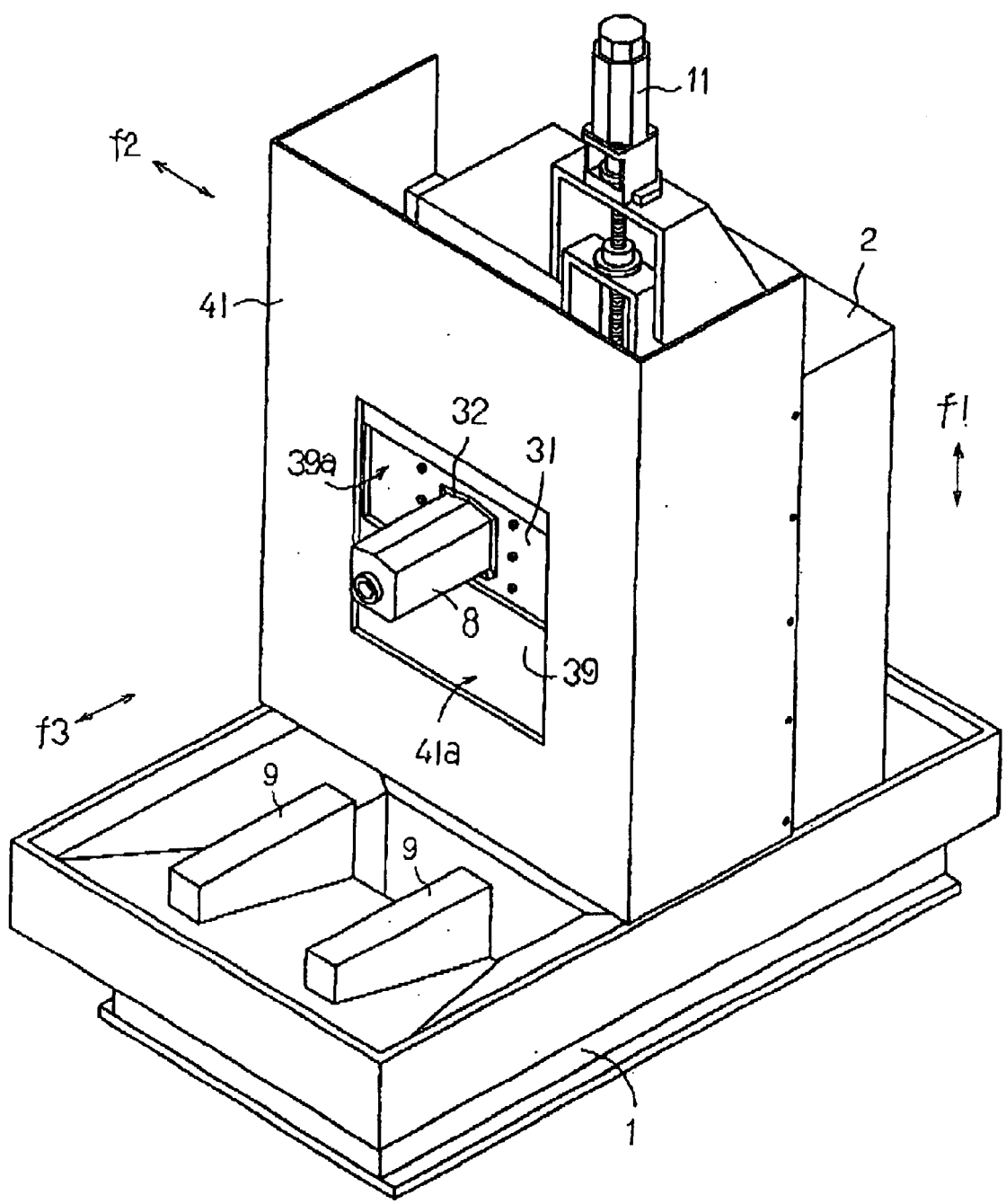
FIG. 10 is a perspective view of the machine tool provided with the third cover plate.

In the fundamental structure of the above-mentioned machine tool, a column side cover body cov1 of FIG. 10, which covers the front surface of the column 2, is optimized and installed so as not to make a useless space. The concrete structure is explained with reference FIGS. 6 to 11.

Figure 6:
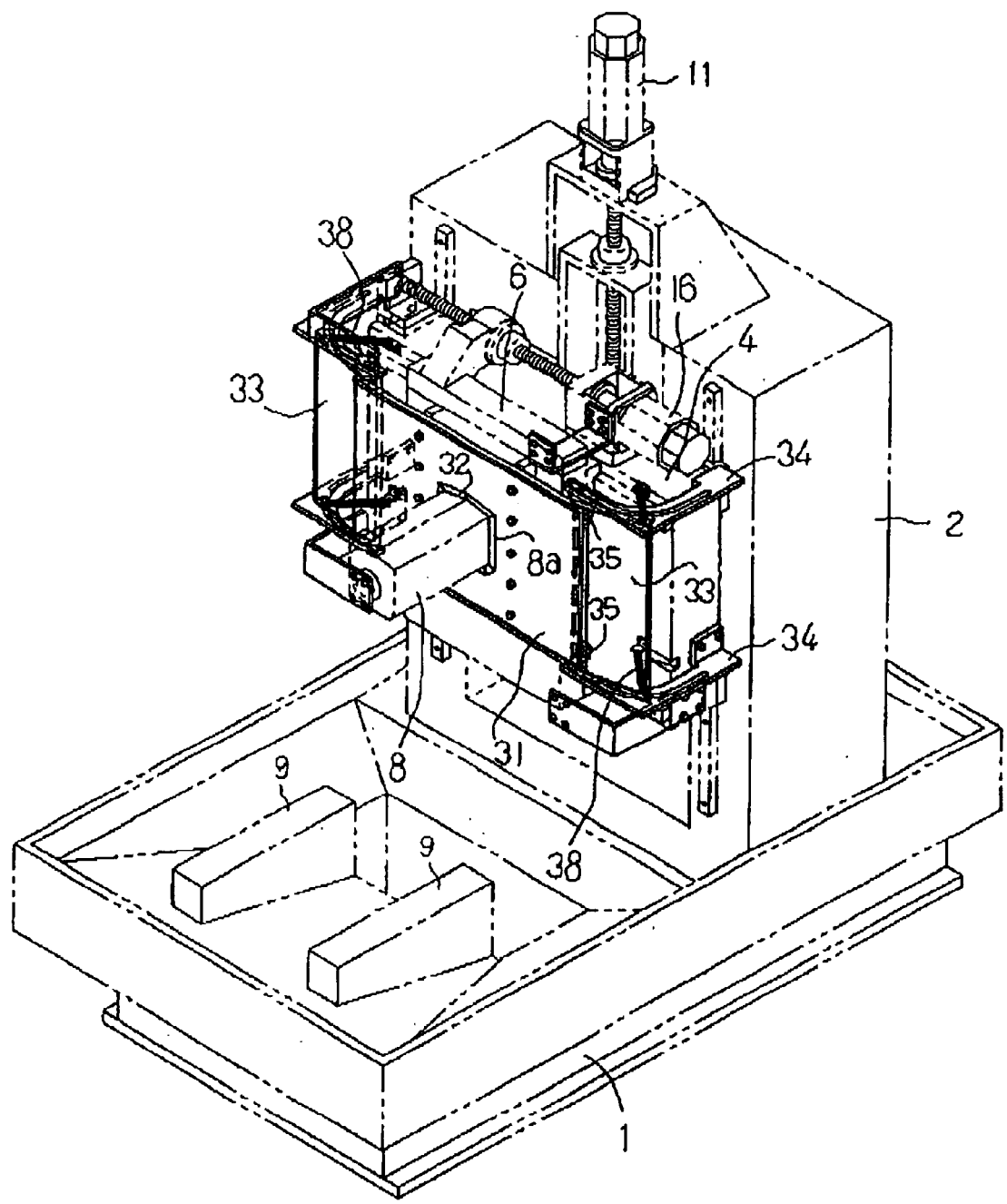
FIG. 6 is a perspective view of the machine tool provided with a column side cover body.

As shown in FIG. 6, the first cover plate 31 is fixed on the front surface of the second saddle 6 so as to mostly cover the whole. A through hole 8a is formed to the center of the first cover plate 31 so that the spindle head 8 can be inserted movably in longitudinal direction. Besides, a sealing means 32 is fixed to the inner circumference of the through hole 8a so as to seal a space between the through hole 8a and the spindle head 8 in a liquid-tight manner. For example, a flexible band rubber body is used as the sealing means 32.

Figure 7:
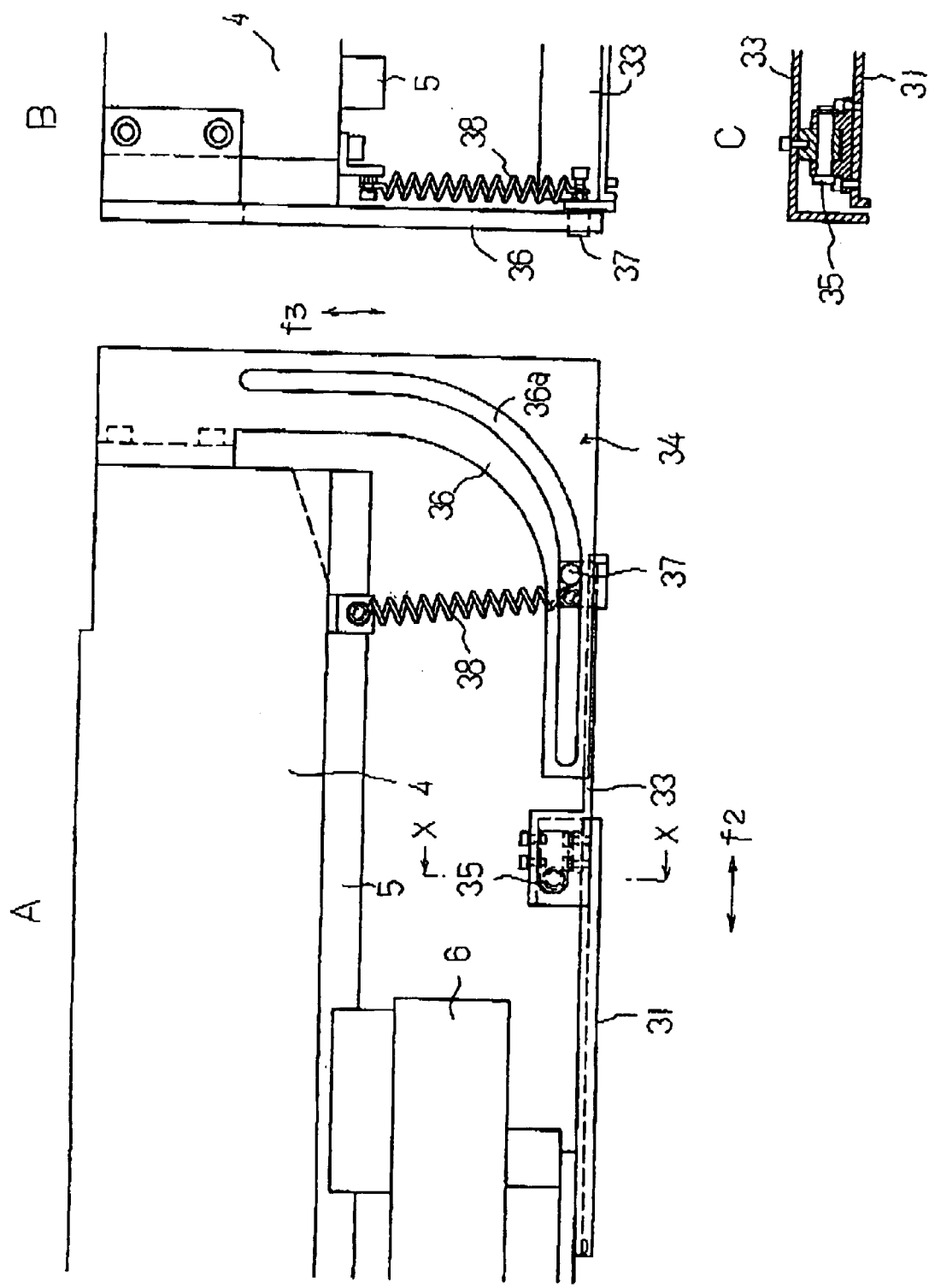
FIG. 7 shows the circumference of the first cover plate.
Figure 8:
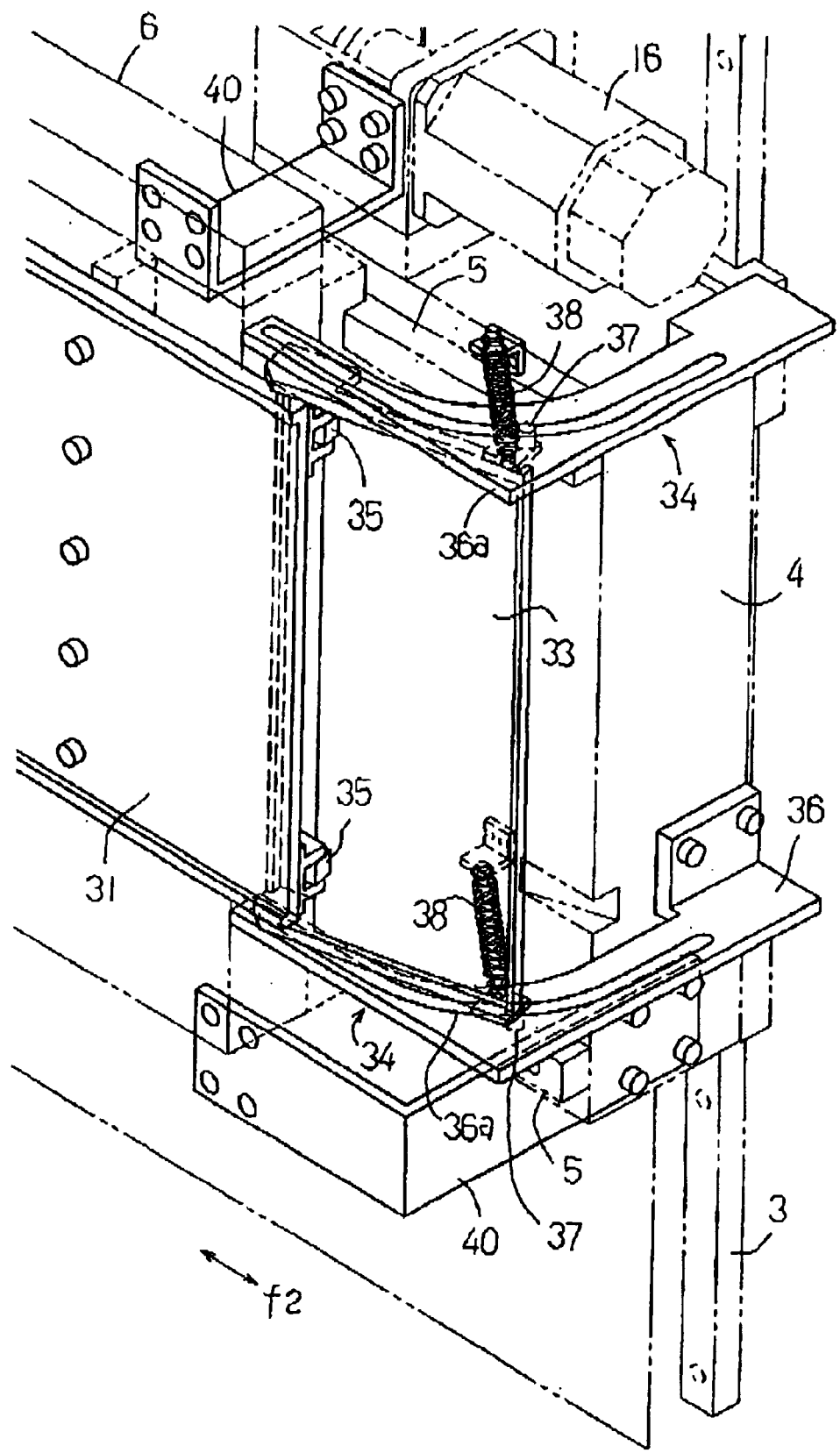
FIG. 8 is a perspective view of a cross side of the first cover plate.

Side cover plates 33 are connected to right and left edges of the first cover plate 31 so as to be turnable backward. Here, they are turned by guiding means 34 provided between the first saddle 4 and the side cover plates 33. In detail, as shown in FIGS. 7 and 8, each side cover plates 33 is installed rockably on each edge of the first cover plate 31 with hinge couplings 35. And each guiding means 34 is formed so as to correspond to each side cover plate 33. The guiding means 34 comprises a guiding mechanism formed in the top and bottom sides of the side cover plate 33. For example, the guiding mechanism is composed as follows. Guiding plates 36 in a hook-shape at the front sight are fixed on ends of the first saddle 4, and rollers 37 installed protrusively to the top and bottom edges of each side cover plate 33 are inserted into quarter circular guiding paths 36a thereof, correspondingly. Besides, a spring 38 of an energizing means is extensively hanged between a place near the center of curvature of each quarter circular guiding path 36a and a place near each pin body 37. And each side cover plate 33 is pulled backward by an energizing force due to the springs 38.

Besides, as shown in FIG. 9, the second cover plate 39 that covers the front, top and bottom sides of the first cover plate 31 is fixed integrally with the first saddle 4 with combining members 40. Here, the second cover plate 39 has a rectangular through hole 39a to allow the spindle head 8 to move laterally.

Figure 11:
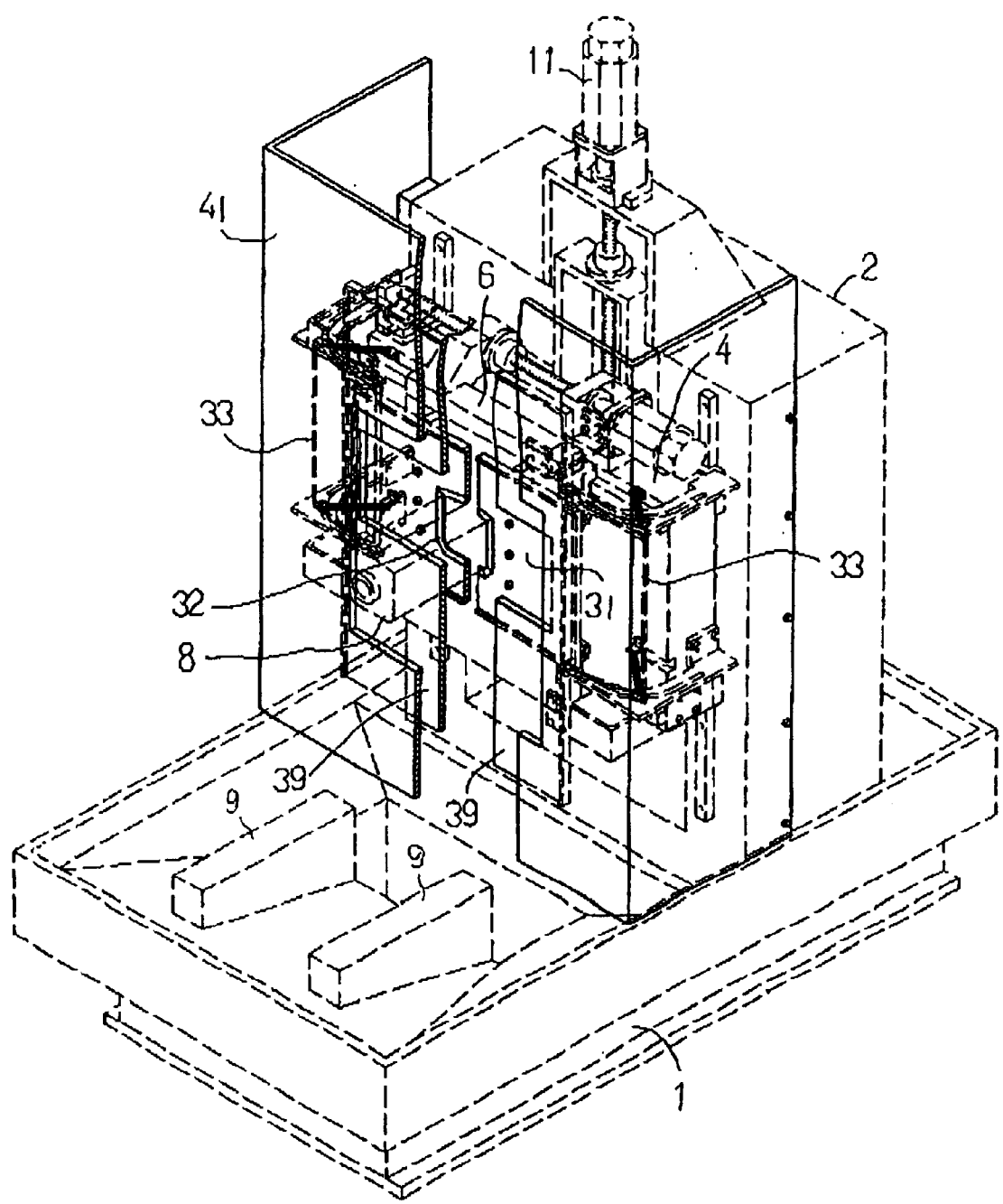
FIG. 11 is a perspective view of the machine tool broken away at the third cover plate and other parts.

Moreover, as shown in FIGS. 10 and 11, the third cover plate 41 in an angular C shape in plan view is fixed on the front side of the second cover plate 39 integrally with the column 2. In this case, the third cover plate 41 has a rectangular through hole 41a to allow the spindle head 8 to move vertically and laterally.

The operation of the column side cover body is explained as follows.

When the servomotor 11 rotates, the first saddle 4 and the spindle head 8 are moved in vertical direction f1. In this case, the first cover plate 31, the side cover plates 33 and the second cover plate 39 are vertically moved integrally with the first saddle 4. Though the third cover plate 41 is fixed on the column 2 so as not to move vertically, the through hole 41a allows the spindle head 8 to move vertically. During this vertical movement, a longitudinal space due to the through hole 39a is intercepted by the first cover plate 31 and the side cover plates 33. Besides, a longitudinal space due to the through hole 41a is intercepted by the second cover plate 39, the first cover plate 31 and the side cover plates 33.

When the servomotor 16 rotates, the second saddle 6 and the spindle head 8 are moved in lateral direction f2. In this case, the first cover plate 31 is laterally moved integrally with the second saddle 6, and the side cover plates 33, 33 move laterally in connection with the lateral movement. Though the second cover plate 39 and the third cover plate 41 are not laterally moved, the through holes 39a, 41a allow the spindle head 8 to move laterally, respectively.

When each side cover plate 33 is laterally moved, each pin body 37 is guided by each quarter circular guiding path 36a and moved. During this movement, the effect on the roller 37 makes each side cover plate 33 rock around each hinge coupling 35 longitudinally.

Figure 12:
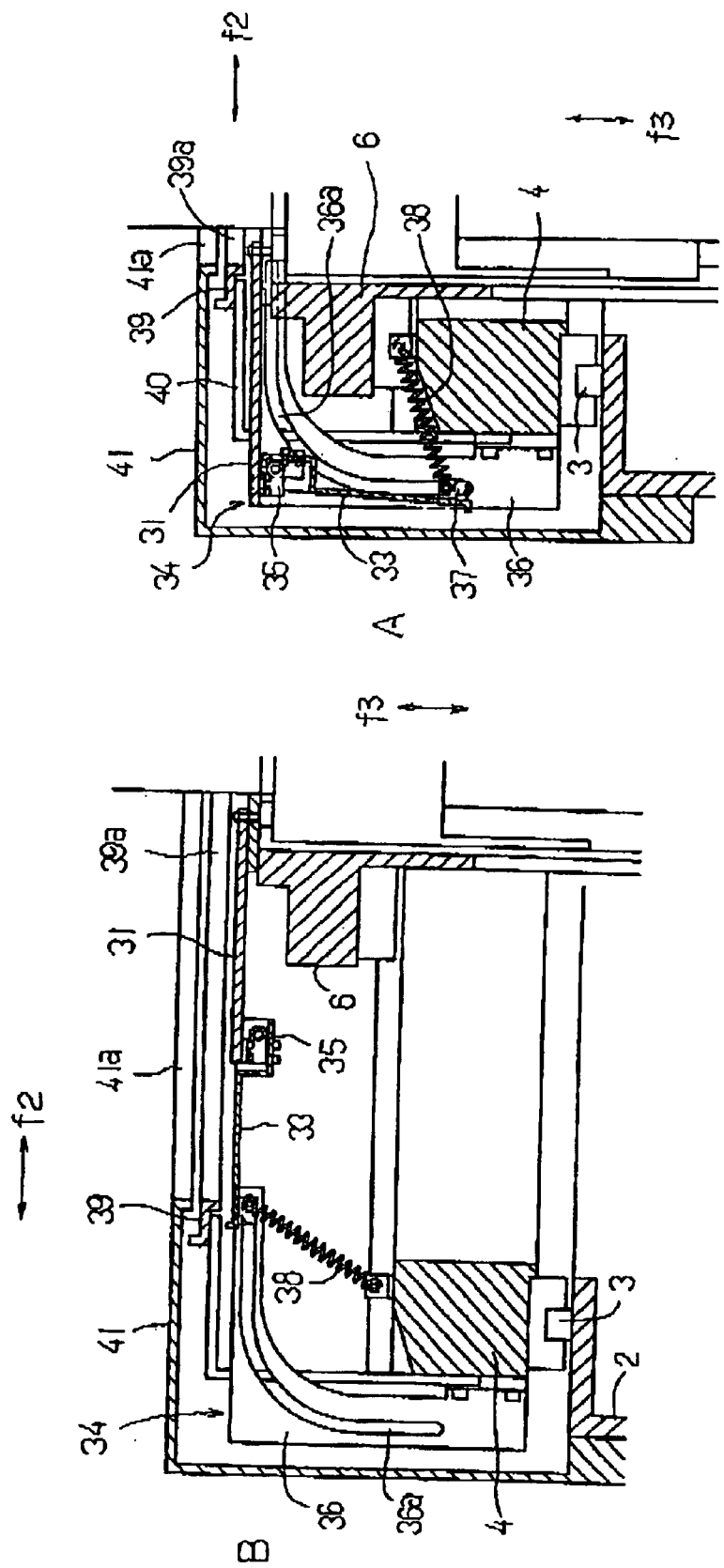
FIG. 12 shows the operating situation of the right side part of the column of the machine tool viewed from above.

For example, when the second saddle 6 is moved to its rightmost position, as shown in FIG. 12A, the right side cover plate 33 is rocked to 90° in back of the hinge couple 35 due to an interaction between the guiding path 36a and the pin body 37. Conversely, when the second saddle 6 is moved to its leftmost position, as shown in FIG. 12B, the left side cover plate 33 is positioned in the same lateral direction due to the interaction, and operates so as to intercept the longitudinal space due to the through hole 39a. The right side cover plate 33 operates symmetrically to the left side cover plate 33. Therefore, the longitudinal space due to the through hole 39a is closed by the first cover plate 31 and the side cover plates 33, 33 irrespective of the position of the second saddle 6 in lateral direction f2. The longitudinal space due to the through hole 41a is closed by the second cover plate 39, the first cover plate 31 and the side cover plates 33, 33.

Furthermore, when the servomotor 27 rotates, the spindle head 8 is moved in longitudinal direction, and the spindle 28 is moved to an optional position in triaxial direction. In this case, while the spindle head 8 moves backward, the sealing means 32 wipes and drops the chips and the coolant adhered to the circumferential surface of the spindle head 8. Therefore, the chips and the coolant are prevented from getting in back of the first cover plate 31.

Then, while the second saddle 6 moves laterally, the spring 38 pulls the pin body 37 of the side cover plate 33 toward the place near the center of curvature of the guiding path 36a, and presses it to the circumferential surface thereof. Therefore, backlash due to clearance of the side cover plate 33 is prevented.

Figure 13:
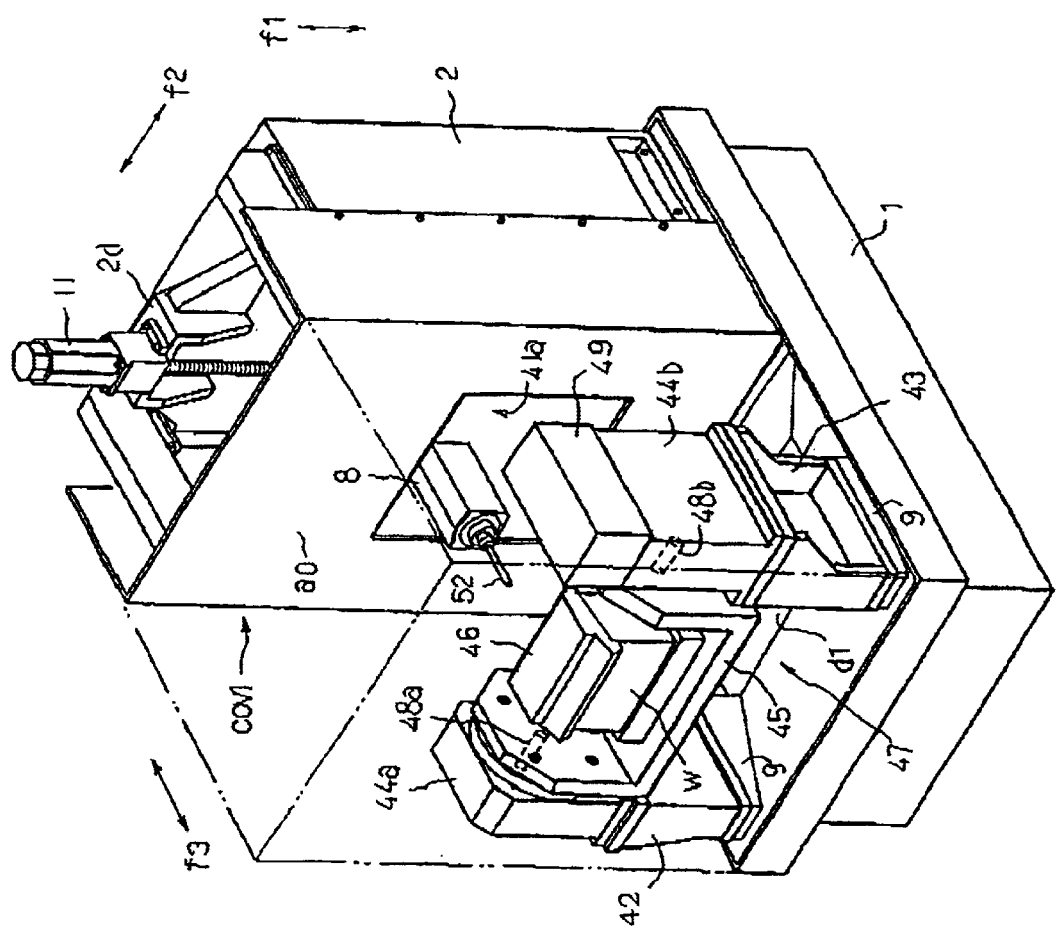
FIG. 13 is a perspective view of the machine tool having a jig device.

A jig device 42 shown in FIG. 13 is installed at the front of the column side cover body cov1. The jig device 42 is formed as follows. Intermediate tables 43, 43 are fixed on the above-mentioned supporting members 9, 9, and bearing bodies 44a, 44b are fixed on the intermediate tables 43, 43, respectively. A jig main body part 47 is erected between the right and left bearing bodies 44a, 44b rotatively through lateral axes 48a, 48b. Here, the jig main body part 47 has a work acceptor 45 in U letter shape and a clamping means 46 to fix the work "w" mounted on the work acceptor 45. Besides, a jig driving part 49 is installed on the bearing acceptor 44b, rotating the jig main body part 47 around the lateral axes 48a, 48b and fixing it at an optical position.

As shown in FIGS. 14 to 17, a jig side cover body cov2 and an intermediate cover body cov3 are optimized so as not to generate useless space and are assembled on the upper surface of the bed 1 within the range from the jig device 42 to the front surface of the column 2.

The jig side cover body cov2 is formed so as to cover the front, right and left and upper surfaces of the jig main body part 47. An opening 47a is provided on the front surface wall a1 so as to deposit and draw the work "w" and be closed by a not-illustrated door. The upper surface wall a2 is formed somewhat higher than the maximum height of the rotation locus of the jig main body part 47 around the lateral axes 48a, 48b. The right and left side surface walls a3, a4 are located between the right and left side surfaces of the work acceptor 45 and the right and left bearing bodies 44a, 44b, respectively. Therefore, even if the right and left side surface walls a3, a4 are located at the outside of the right and left side surfaces of the work acceptor 45, no useless spaces are formed inside the jig side cover body cov2. In this case, the front surface wall a1, the side surface walls a3, a4 are fixed on the bed 1 with bolts. In removing this bolting, the jig side cover body cov2 is separated from the bed 1.

The intermediate cover body cov3 is formed so as to cover the upper and right and left side surfaces within the range from the back end edge of the jig side cover body cov2 to the front surface wall a0 of the column side cover body cov1 in an inverse U cross section. The upper surface wall b1 is somewhat higher than the maximum height of vertical moving range of the spindle head 8. The facing distance between the right and left side surface walls b2, b3 is somewhat bigger than the lateral moving range of the spindle head 8. In this case, the side surface walls b2, b3 are fixed on the bed 1 with bolts. In removing this bolting, the intermediate cover body cov3 is separated from the bed 1.

Figure 14:
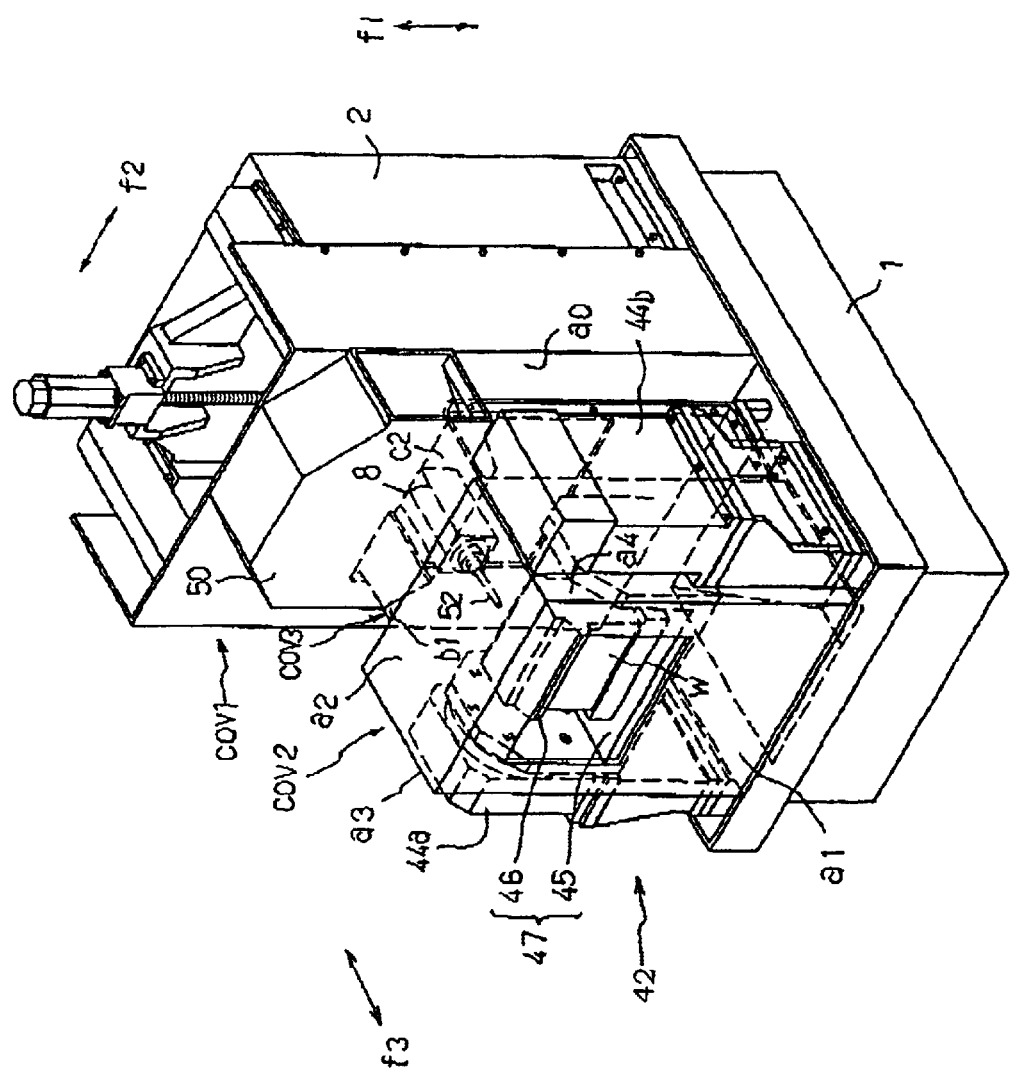
FIG. 14 is a perspective view of the machine tool provided with a cover body on the jig device and other parts.
Figure 15:
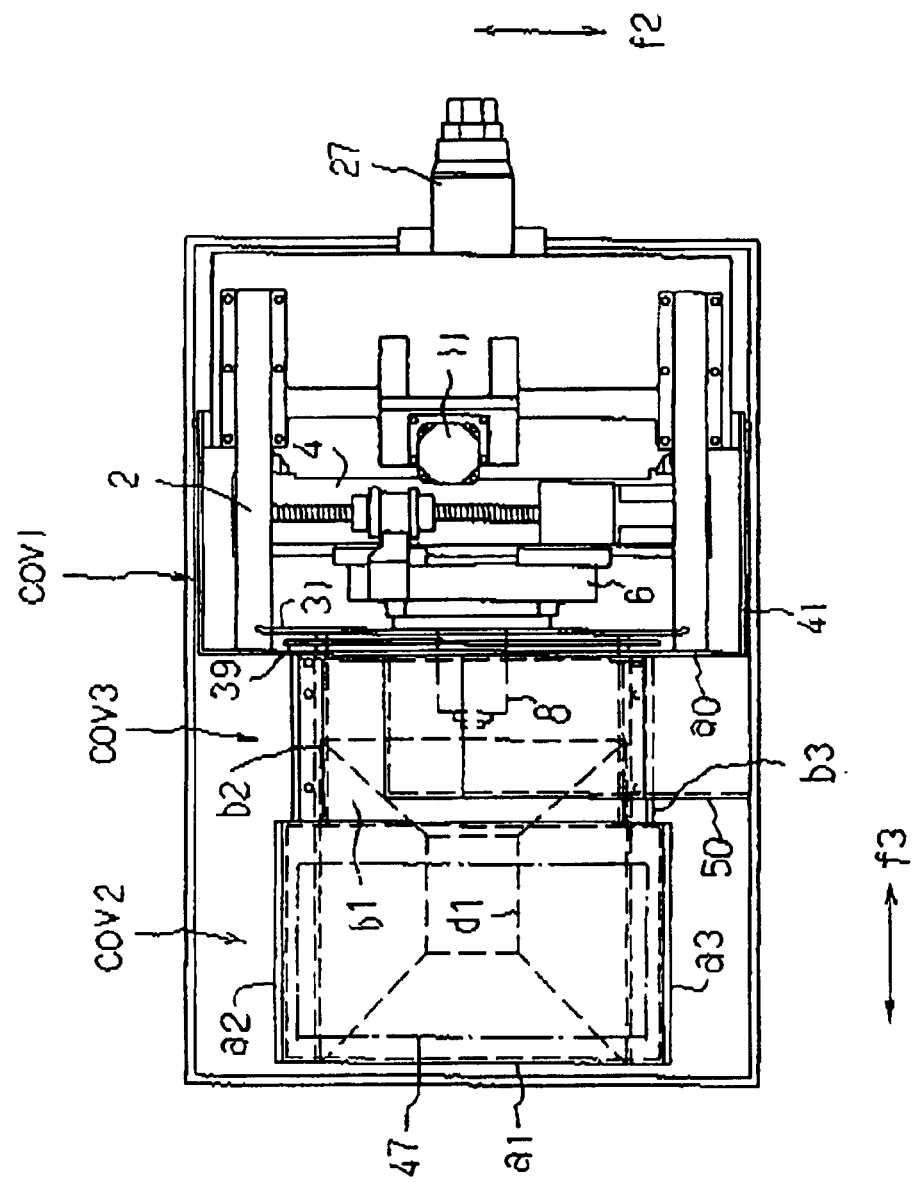
FIG. 15 is a plan view of FIG. 14.
Figure 16:
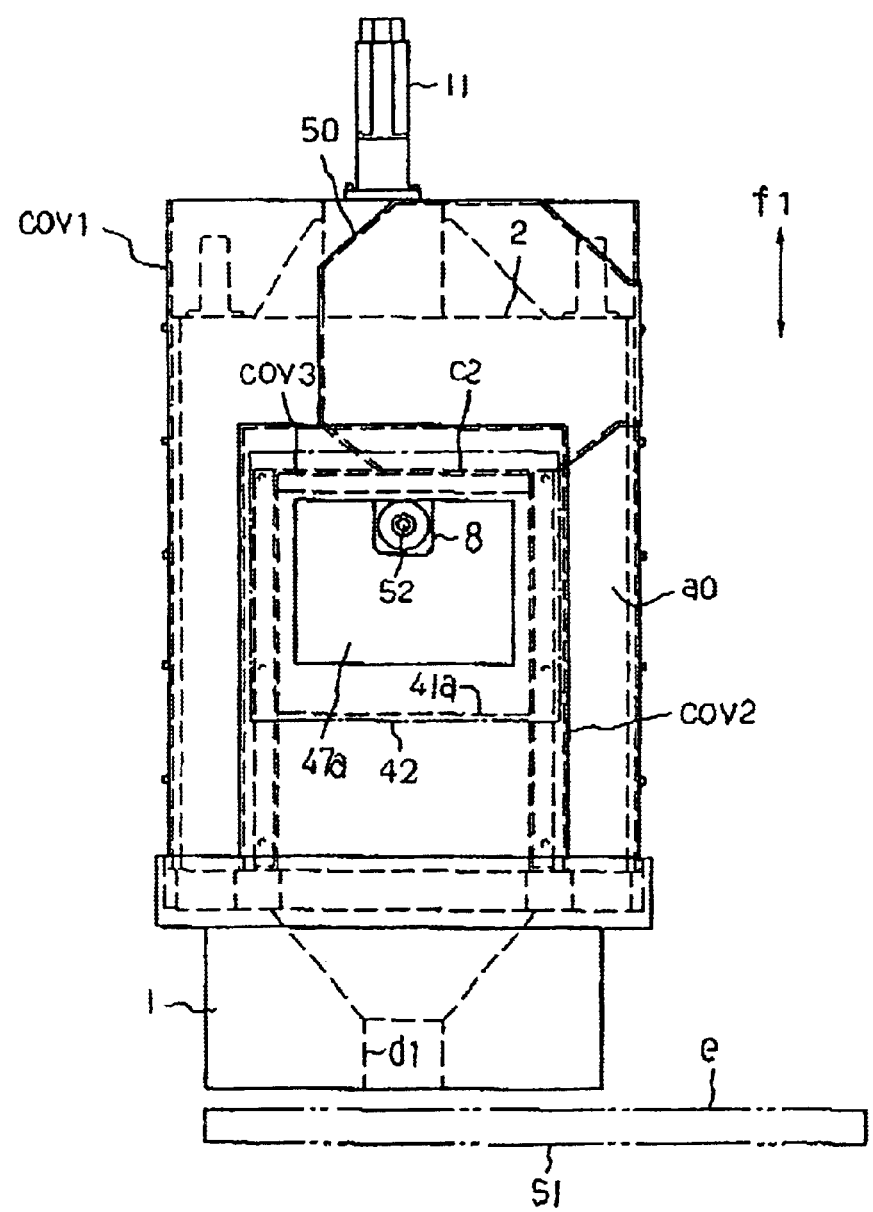
FIG. 16 is a front view thereof.
Figure 17:
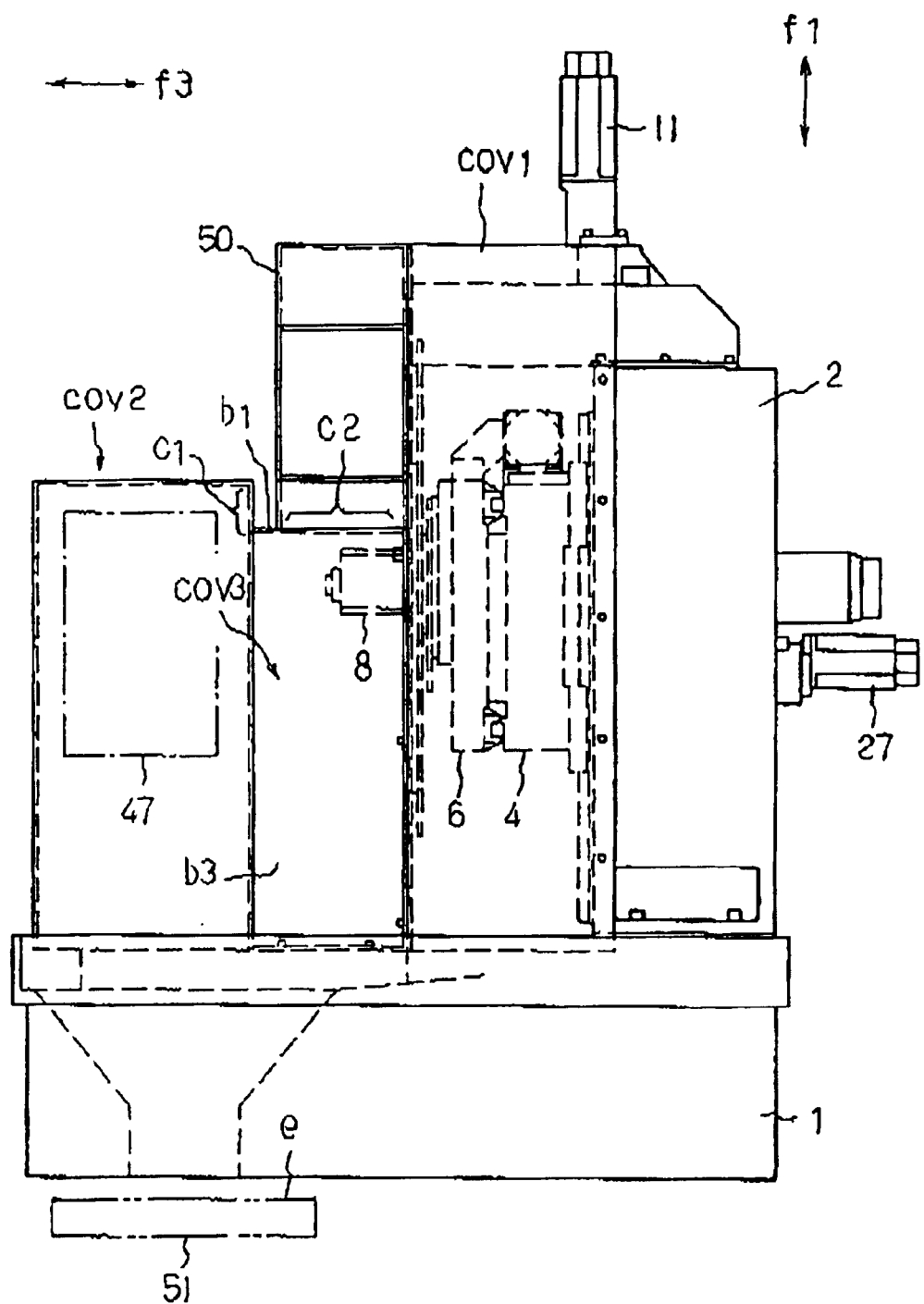
FIG. 17 is a side view thereof.

Generally, as shown in FIGS. 14 and 17, the jig side cover body cov2 is higher than the intermediate cover body cov3. In a case in which one of these cover bodies is higher than the other, a plate member is fixed on a lateral open surface c1 of the higher cover body (which is the jig side cover body cov2 in drawings). Therefore, the specific space surrounded by the jig side cover body cov2, the intermediate cover body cov3 and the column side cover body cov1 is formed in a machining space close to the dispersion of chips and coolant generated during machining the work "w".

An exhaust duct 50 is installed on the upper surface of the intermediate cover body cov3. The inside space of the exhaust duct 50 communicates with the machining space through an opening c2 formed on the upper surface of the intermediate cover body cov3, and gas within the machining space is guided to some other place.

A dropping hole d1 is formed below the jig side cover body cov2 and the intermediate cover body cov3 to exhaust the chips. A chip exhausting device 51 is installed just under the dropping hole d1 to receive and take out the dropped chips to some other place.

The operation is explained as follows.

The work "w" fixed on the jig main body part 47 is cut due to displacement of the spindle 28 in vertical, lateral and longitudinal directions f1, f2, f3 and rotations of a cutting tool 52 by the driving motor. Here, the cutting tool 52 is installed on the tip of the spindle 28. Any machining, such as coolant, mist or dry machining, can perform the cutting.

During machining of the work "w", in case of dry machining or mist machining, the chips generated by the cutting tool 52 are energized and dispersed by rotations of the cutting tool 52. On the other hand, in case of coolant machining, coolant is dispersed in place of the chips. The chips and the coolant leaving for wall surfaces of the jig side cover body cov2 or the intermediate cover body cov3 crash into these wall surfaces, thereby being prevented from dispersing to the outside. Besides, the chips and the coolant leaving for the column side cover body cov1 crash into the front surface wall a0 and so on of the third cover plate 41, thereby being prevented from dispersing backward further. The intercepted chips and coolant leave for the upper surface of the bed 1 by gravity and fall down on a carrier surface "e" of the chips exhausting device 51 through the dropping hole d1. In this case, only the chips are left on the upper surface "e" and the coolant falls down farther. The exhausting device 51 takes out and exhausts the chips to some other place. On the other hand, the coolant is withdrawn at a specific place and supplied to the cutting place again.

In detail, some of the chips and the coolant leaving for the column side cover body cov1 pass through the through hole 41a of the third cover plate 41. The passed chips and coolant crash into the second cover plate 39 to be suppressed, or further pass through the through hole 39a of the second cover plate 39. The chips and the coolant passed through the through hole 39a crash into the first cover plate 31 and the side cover plate 33 to be suppressed. Therefore, even if the spindle head 8 is positioned at an optional place within its moving range, the chips and the coolant are surely suppressed by the first, the second and the third cover plates 31, 39, 41 and the side cover plates 33. They do not fall directly on the first saddle 4 and the second saddle 6.

The whole form of the machining space formed by three cover bodies cov1, cov2, cov3 can be miniaturized in comparison with a single square cover body shown in a virtual line in FIG. 13.

The present invention can give the following effects.

During cutting of the work, the chips and the coolant dispersed from the cutting tool are surely prevented from dispersing to the outside of the machining space surrounded by the column side cover body, the intermediate cover body and the jig side cover body. Besides, since the size of the machining space is optimized to every cover body, the whole machine tool is miniaturized. Therefore, each part within the machining space can be handled conveniently, thereby increasing workability. Besides, especially since the intermediate cover body and the jig side cover body are lower, the work area is exposed to view, thereby improving the working environment.

Besides, the column cover body, the intermediate cover body and the jig side cover body, respectively, can be manufactured independently and assembled to the bed. Therefore, the manufacture is made easy and efficient. Besides, since the cover configuration is assembled and disassembled easily, the machining space can be maintained and inspected conveniently.

Moreover, the chips and the coolant generated inside the machining space can be gathered at the specific place through the dropping hole without human help.

Furthermore, the chips dropped through the dropping hole can be taken out to the specific place without human help.

What is claimed is:

1. A column fixed type machine tool comprising;
   a column (2) fixed on a bed (1);
   a spindle head (8) installed at a front of the column (2) movably in vertical and lateral directions f1, f2 and in longitudinal direction f3 through a first saddle (4) and a second saddle (6),
   a jig device (42) fixed at a limited position of the bed at the front of the column,
   a first cover plate (31) fixed on a front surface of the second saddle (6), said first cover plate (31) allowing the spindle head (8) to move in a longitudinal direction therethrough,
   a second cover plate (39) fixed integrally with the first saddle (4), said second cover plate (39) covering a front side, an upper side and a below side of the first cover plate so as to allow the spindle head to move in a lateral direction,
   a column side cover body (cov1) installed on a front side of the second cover plate (39), said column side cover body covering a front surface of the column so as to allow the spindle head (8) to move in vertical and lateral directions,
   a jig side cover body (cov2) installed on the jig device side, said jig side cover body covering a jig main body part (47),
   an intermediate cover body (cov3) installed between the jig side cover body (cov2) and the column side cover body cov1, said intermediate cover body (cov3) covering an upper and right and left side surfaces of a spindle head (8) moving range, and
   wherein the column side cover body (cov1), the jig side cover body (cov2) and the intermediate cover body (cov3) are formed independently from each other and attached to and detached from the machine tool separately.

2. A column fixed type machine tool as claimed in claim 1, wherein heights of the column side cover body (cov1), the jig side cover body (cov2) and the intermediate cover body (cov3) are different each other, the column side cover body (cov1) being the highest and the intermediate cover body (cov3) being the lowest.

3. A column fixed type machine tool as claimed in claim 2, wherein the intermediate cover body (cov3) is formed into an inverse U letter cross section, and has an exhaust duct (50) on an upper surface thereof.

4. A column fixed type machine tool as claimed in claim 2, wherein a dropping hole d1 is formed to the bed positioned below the intermediate cover body (cov3) to exhaust chips.

5. A column fixed type machine tool as claimed in claim 4, wherein a chips exhausting device (51) is installed below the dropping hole d1.

* * * * *